(12) United States Patent
Reidy

(10) Patent No.: US 7,337,615 B2
(45) Date of Patent: Mar. 4, 2008

(54) THERMOELECTRIC, HIGH-EFFICIENCY, WATER GENERATING DEVICE

(76) Inventor: James J. Reidy, 1260 Main St., Holden, MA (US) 01520-1020

( * ) Notice: Subject to any disclaimer, the term of this patent is extended or adjusted under 35 U.S.C. 154(b) by 183 days.

(21) Appl. No.: 10/553,743

(22) PCT Filed: Mar. 23, 2004

(86) PCT No.: PCT/US2004/008861

§ 371 (c)(1),
(2), (4) Date: Oct. 13, 2005

(87) PCT Pub. No.: WO2004/094317

PCT Pub. Date: Nov. 4, 2004

(65) Prior Publication Data

US 2006/0288709 A1    Dec. 28, 2006

(51) Int. Cl.
*F25B 21/02* (2006.01)
(52) U.S. Cl. .......................... 62/3.4; 62/285
(58) Field of Classification Search .................. 62/3.2, 62/3.4, 93, 285, 291
See application file for complete search history.

(56) References Cited

U.S. PATENT DOCUMENTS 5,634,342 A * 6/1997 Peeters et al. ............... 62/3.4
6,481,232 B2 * 11/2002 Faqih .......................... 62/291
6,574,979 B2 * 6/2003 Faqih .......................... 62/285
6,705,104 B2 * 3/2004 Tani et al. ................... 62/291
2002/0046569 A1 * 4/2002 Faqih .......................... 62/188

* cited by examiner

*Primary Examiner*—Melvin Jones
(74) *Attorney, Agent, or Firm*—Brian M. Dingman; Mirick, O'Connell, DeMallie + Lougee, LLP

(57) ABSTRACT

A water generating device utilizing thermoelectric cooling, also known as Peltier technology, for obtaining potable water from ambient air inside or outside a structure or dwelling, having a unique continuous duct for bringing this supply of ambient air to the device and for releasing the air back outside the device after it has been processed. This device includes a cold sink with which the incoming air is cooled below the dew point to condense the existing water vapor. The cooled air is then redirected over the heat sink which increases the efficiency and cooling capability of the device over that of using only the warmer ambient air to cool the heat sink. The rate of air flow is controlled by the variable speed of one or more fans or blowers. The fan or blower speed in turn is controlled by a device that determines the current ambient dew point by measuring the temperature and relative humidity, and the temperature of the cold sink. The incoming air flow is increased or decreased by the fan or blower, to the maximum possible flow rate without excessively exceeding the determined dew point temperature of the incoming air being processed.

29 Claims, 4 Drawing Sheets

THERMOELECTRIC, HIGH-EFFICIENCY, WATER GENERATING DEVICE

FIELD OF THE INVENTION

The present invention relates to a water-condensing apparatus, and more particularly, to a thermoelectric device which makes potable water from the air.

BACKGROUND OF THE INVENTION

In recent years, it is becoming more useful for people in both offices and in the home to drink bottled water rather than water from a water tap. Countless other situations exist where water is difficult to obtain or where the quality of available water leaves much to be desired. In many cases this also creates a need to carry the water from the place where it was purchased to the place where it will be used. Accordingly, there have been some attempts to provide on-site water generation to alleviate these problems. Virtually all of these attempts have utilized more traditional methods of conventional compressors, refrigerant, and evaporator and condenser coils. Some attempts have been made to extract water vapor from the air using thermoelectric technology on a small scale, such as with a closet dehumidifier. All known attempts have ignored the benefit of using cooled air for reasons other than cooling a small confined area, as is the case with refrigerators found on aircraft.

SUMMARY OF THE INVENTION

The present invention provides a potable water generator designed to produce potable water from the ambient air using new and existing thermoelectric, sensing, and computational technologies and other known devices in a unique combination that safely and efficiently extracts potable water from the ambient air in a wider range of temperature and humidity conditions than traditional refrigerant-based systems. This invention deals with maximizing the efficiency of the dehumidification process by uniquely utilizing the cooled air to cool the heat sink of the thermoelectric device, supplemented, as needed, with additional ambient air passed over the heat sink The invention also deals with controlling the air flow in relation to the incoming ambient air temperature and the temperature of the cold sink as it relates to the dew point.

This invention provides for unique duct means that diverts and utilizes the cooled processed air to further increase the efficiency of cooling the thermoelectric heat sink, thereby significantly increasing the efficiency of the device. This duct can be supplemented with additional ambient air to further cool the heat sink as may be required.

This invention provides an air duct that also serves as a means to capture the condensed water vapor and divert it into the subsequent water treatment and/or storage in a closed, continuous system.

This invention provides a repetitive means to determine the existing dew point of the ambient air and a means to control the rate of ambient air flow over the cold sink, which allows maximum condensation of the existing water vapor, with the minimum amount of expended energy, and over a wider range of temperature and humidity extremes.

This invention provides a sterile inlet to the treatment or storage area (permanent or temporary) of water condensed from the air by the strategic placement of an ultraviolet bulb at the water exit from the air duct into the treatment or storage area. This invention also provides a sterile exit from the water treatment system using the same strategically placed ultraviolet bulb at the water exit point from the treatment system into the storage area and/or the exit point from the storage area. On larger models, this may be accomplished with a second UV bulb.

This invention provides repetitive ultraviolet sterilization of the pretreated water, and again as treated water, using the same strategically placed ultraviolet bulb, with ultraviolet transmissive tubing. On larger models, this may be accomplished with a second UV bulb.

BRIEF DESCRIPTION OF THE DRAWINGS

Other objects, features and advantages will occur to those skilled in the art from the following description of the preferred embodiments, and the accompanying drawings, in which.

DETAILED DESCRIPTION OF THE PREFERRED EMBODIMENTS

Figure 1:
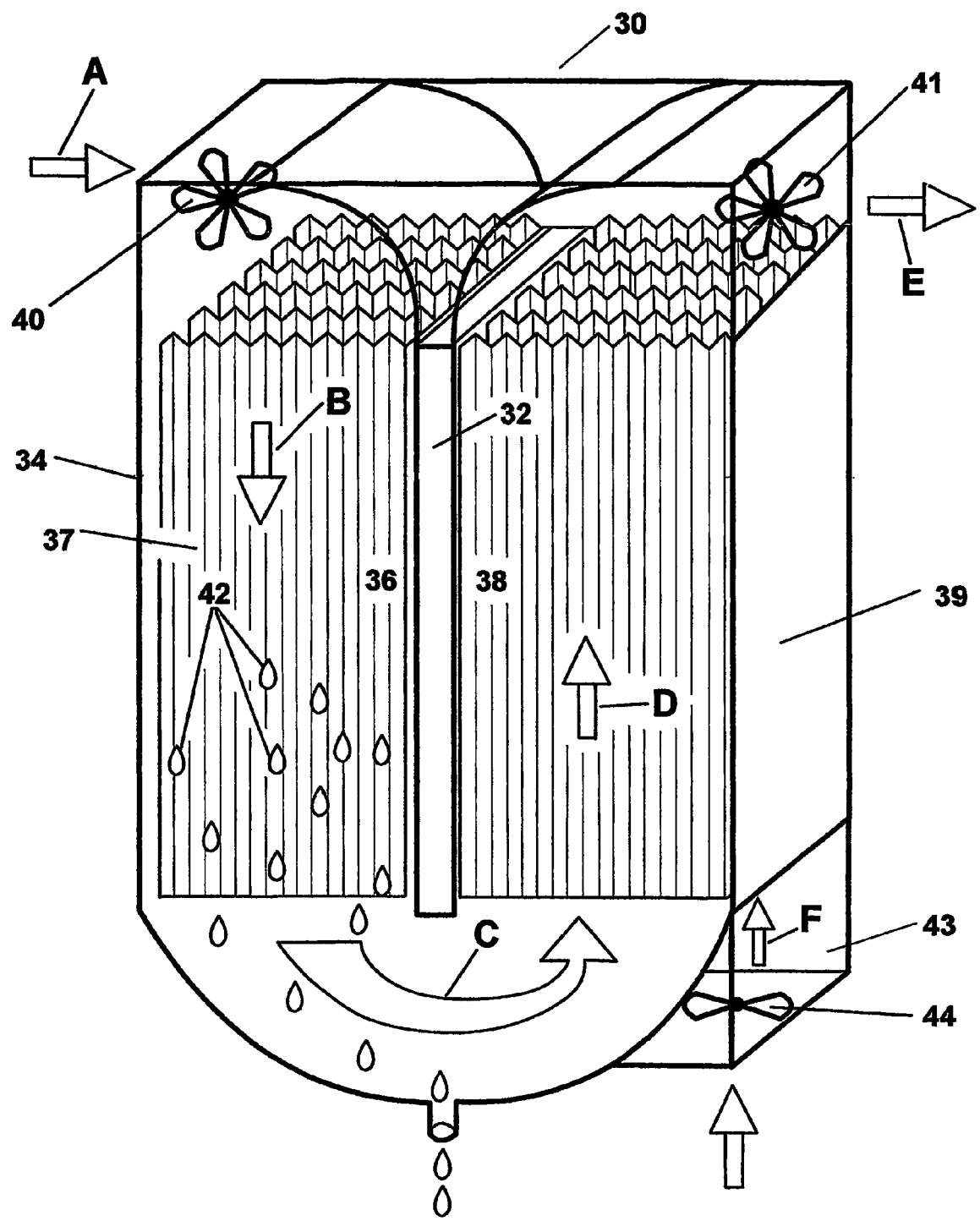
FIG. 1 is a schematic side view of an embodiment of the invention. It depicts only the features pertaining to this invention. It does not show all of the other features such as water and air filters, ultraviolet exposures, power and electrical diagrams, cabinetry, and control panel.

Water generating device 30 according to this invention, is shown in FIG. 1. Thermoelectric device 32 has cold sink 36 comprised of a number of cold sink fins 37 thermally coupled to the cold side of device 32, and heat sink 38 comprised of heat sink fins 39 thermally coupled to the hot side of device 32. Blower means 40 and/or 41 (such as fans) directs a stream of ambient air past cold sink 36 to cool the air below its dew point to condense water droplets 42 from the air. This also cools the air. Passage means 34, which may be an air duct, is arranged to direct the air cooled by cold sink 36 past heat sink 38. Since the air is cooled, more heat is drawn away from heat sink 38, which increases the efficiency of device 32, thus extracting or condensing more water from a given energy input. The air flow is depicted by arrows A, B, C, D, E and F. The water collection, treatment, storage, and delivery are not shown in this drawing for clarity purposes. A supplemental air flow of ambient air over heat sink fins 39 can be achieved with an additional duct air entrance 43 and variable speed fan or blower 44 that blows air in the direction of arrow F. For clarity their exact positioning is not shown.

Figure 2:
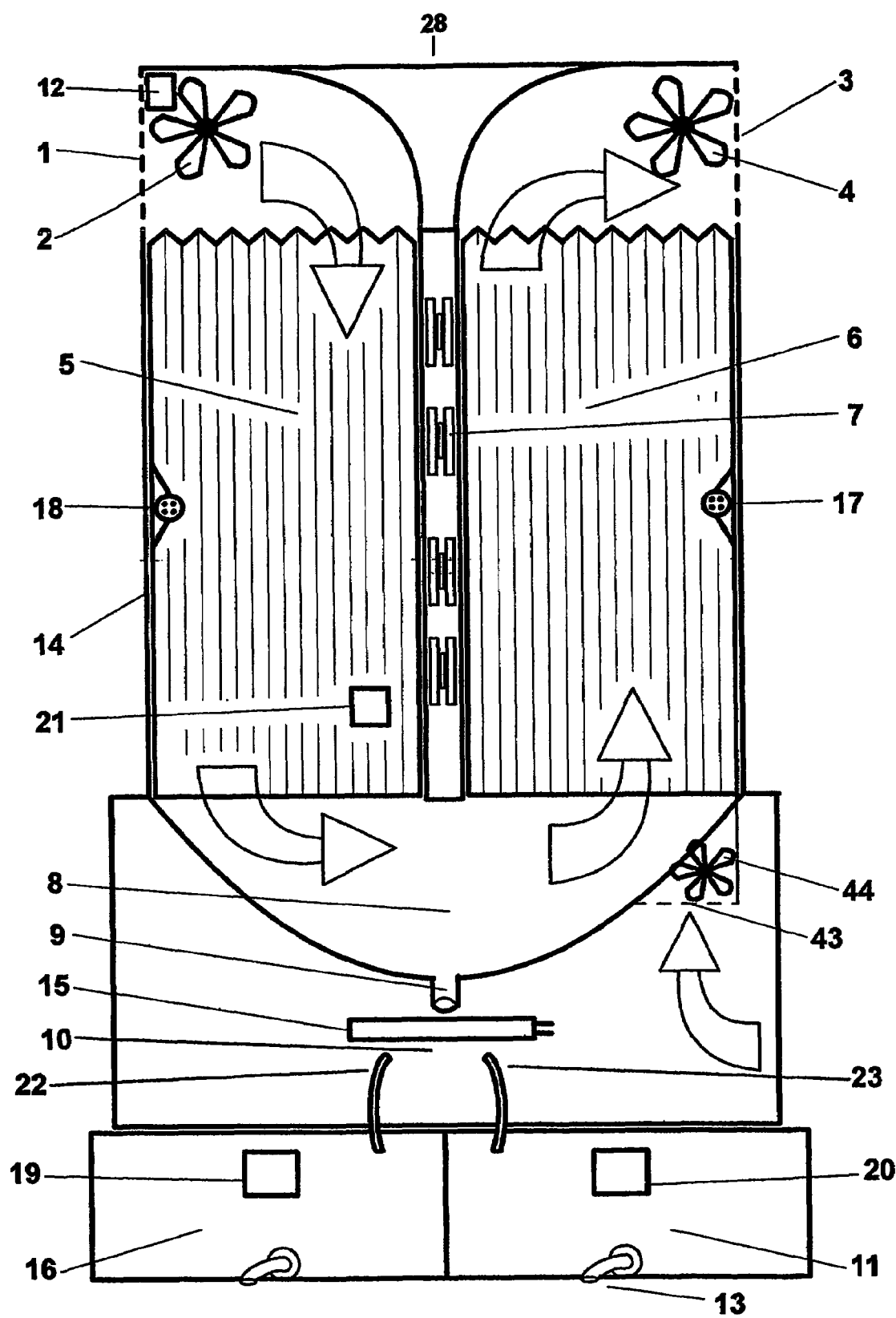
FIG. 2 is a schematic diagram of a preferred embodiment of the invention.

A more complete preferred embodiment of the water generating device of this invention is shown in FIG. 2, wherein device 28 illustrates the components pertinent to this invention. For clarity, it does not show additional known features that may be preferred or desired within a completely successful device.

There is an incoming ambient air inlet 1 and a processed air outlet 3 at the ends of a continuous air duct 14. Ambient air is drawn into the ductwork by variable-speed fan or blower 2 and forced throughout the ducting system. It may be supplemented by exit variable-speed fan or blower 4, and/or additional duct air entrance 43 and variable speed fan or blower 44. For clarity their exact positioning is not shown. Enclosed in this air duct is cold sink 5 and heat sink 6. One or more thermoelectric devices 7 are positioned (in parallel and/or series, as desired) between the hot and cold sinks to produce the temperature loss on the cold sink and temperature gain on the heat sink.

As the cooled air leaves the cold sink 5 it is diverted directly over the heat sink 6 by ductwork diversion 8, which increases the cooling capability of the heat sink as opposed to the cooling capability using only ambient air, which by definition is warmer.

Ductwork 14 has a lower outlet 9 for the water that has condensed and collected in that area of the air duct. Outlet 9 also serves as an inlet to the initial water storage and/or water treatment system 10. The inlet to this storage or treatment system 10 is protected by an ultraviolet light 15 which may also serve as a sterile inlet and/or an immediate water sterilizer by bathing water passing through outlet 9 in ultraviolet light. Ultraviolet light 15 can also be used to sterilize air that enters water storage devices 11 and 16 as water is withdrawn from the storage devices. This can be accomplished with an air passage comprising tubing or piping 22 and 23 with one end in a container and the other end located such that the end is bathed in light from ultraviolet light 15. In this way, air is sterilized as it enters tubing or piping 22 and 23, thus inhibiting contamination of the water in containers 11 and 16. Ductwork 14 also may contain ultraviolet bulbs 18 and 17 to sterilize cold sink 5 and heat sink 6, respectively, as well as to sterilize the air while in ductwork 14.

It is necessary that the incoming ambient air be cooled to the dew point in order to allow the water vapor to condense from this air. Device 12 determines the dew point temperature of the inlet air in a known fashion from the combined measurements of the incoming air of both temperature and relative humidity that may exist at any given time. Device 12 will then control the desired temperature of the cold sink (at least at or below the dew point) by determining the cold sink temperature, and controlling the volume and speed of the incoming ambient air over the cold sink by controlling, in turn, the operational speed of fan or blower 2, fan or blower 4, and fan or blower 44. A sensor 21 for determining the temperature of the cold sink is also useful for accomplishing this goal.

Ultimately, the treated water will be diverted to a permanent or removable container 11 from which the user may remove potable water. Container 11 could also be split into two containers, 11 and 16, one of which could dispense hot water, and the other cold water. These containers, whether one or two in number, and whether permanent or removable, can be plumbed to any position on device 30, or to a remote storage area For the provision of cooled and/or heated water, water heating device 19 could heat the water in the storage container or as it is extracted, and/or water cooling device 20 could be used to cool the water in the storage container or as it is extracted.

Figure 3:
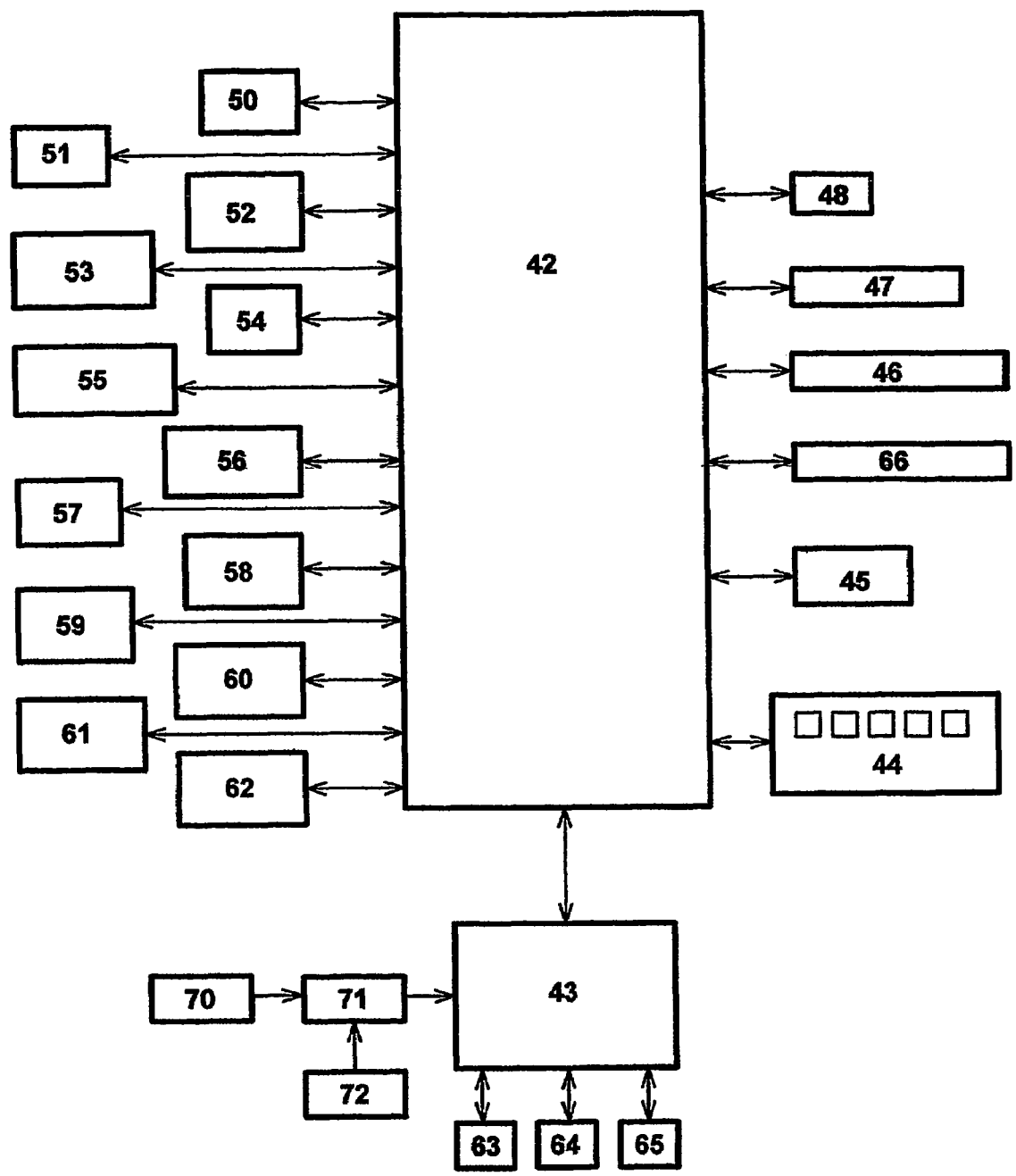
FIG. 3 is a block diagram of the electronics, sensing and control system of a preferred embodiment.

FIG. 3 illustrates the relationships and interactivity between the operator control panel 43 (with switches 63, 64 and 65), the indicator panel 44, the central processing unit (CPU) 42, and additional components that may or may not be present in their entirety. Operator control switches 43 may include on/off switch 63, normal operation switch 64, and efficiency operation switch 65. The system may be enabled to operate in what is called a "normal" mode, and what is called an "efficiency" mode of operation. In the normal mode, operation is controlled with an on/off switch.

In this case, the unit will operate over a wide range of ambient conditions, and actual water production rates will vary accordingly. In the efficiency mode of operation, the system is programmed at the factory so that it will operate automatically only when water production rates are at or above the rates specified by the programming. For example, the unit may operate only when the dew point is such that the unit can make a specified volume of water per specified time period, for example 2 gallons per day. If the conditions are not such that the unit would make 2 gallons per day, while in the efficiency mode of operation the unit would not run. This will assure satisfactory water production rates at minimal energy consumption. Typically, when in efficiency mode the system would automatically sample ambient air periodically, for example twice an hour, and as a result either turn on or turn off, as appropriate. If the unit was not running before such sampling took place, the system would automatically turn on the proper blower(s) or fan(s) to provide ambient air to the sensor, and if the dew point was sufficient, the unit would then remain on and begin extracting water. If the dew point was insufficient, the unit would shut down until the next sampling period.

The invention contemplates operating the system by means of various sources of electricity. Peltier devices operate under direct current supply. The system may have power conditioning means 71 that provides properly conditioned power to the unit, shown in FIG. 3 as provided through controller 43. The exact manner in which the power is supplied would be apparent to those skilled in the art. The system can be enabled to accept power from one or more sources, such a AC power source 72 or DC power source 70. The power source or sources can be line power available at the particular location, or a generator provided for the purpose, or alternative sources of energy such as solar panels. Units with a practical size limitation can be operated by the amount of power that can be supplied by solar panels, which allows the system to be fully portable and used anywhere without the need for a power supply or a generator.

Other inputs to CPU 42 may include first ultraviolet sensor 50, additional ultraviolet sensor(s) 51, reservoir full sensor 52, stored water temperature sensor 53 (of which there may be two), reservoir water level sensor 54, cold sink temperature sensor 55, ambient air temperature sensor 56, ambient humidity sensor 57, air filter efficiency sensor 58, air filter position sensor 59, water filter timed-out sensor 60, water filter volume sensor 61, and valid water filter sensor 62. These various sensors and their use in potable water generating systems are known in the art, for example as disclosed in U.S. Pat. Nos. 5,106,512; 5,149,446; and 5,203,989, all incorporated herein by reference.

The outputs of CPU 42 include one or more of the control of water pump 48, control of thermoelectric device 47, control of a water cooler means 46, control of a water heater means 66, and one or more controls as necessary to control the state and speed of the fans or blowers 45. Also, indicators 44 are controlled by CPU 42.

When the user deactivates the water generating device with off switch 63, all functions cease except the following: all UV lights remain on; the 1st UV sensor 50 continues to monitor for inadequate UV transmission, which would cause CPU 42 to disable the unit from further operation and signal the remedy to the user on the indicator panel 44; the 2nd UV sensor 51, if present, performs in a similar manner; the water filter timed-out sensor 60 or the water filter volume limit sensor 61 also causes the CPU to deactivate the unit and inform the user on the indicator panel 44 of the reason why;

the stored water temperature sensor(s) 53 causes the CPU to activate the 2nd cooler means 46 to cool the stored water, and/or to activate water heating means 66, to their factory-specified temperature(s).

Figure 4:
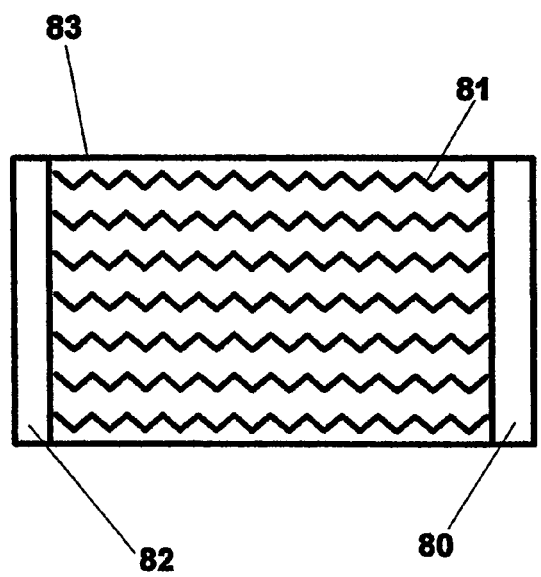
FIG. 4 is a top schematic view of an alternative embodiment of the invention.
Figure 5:
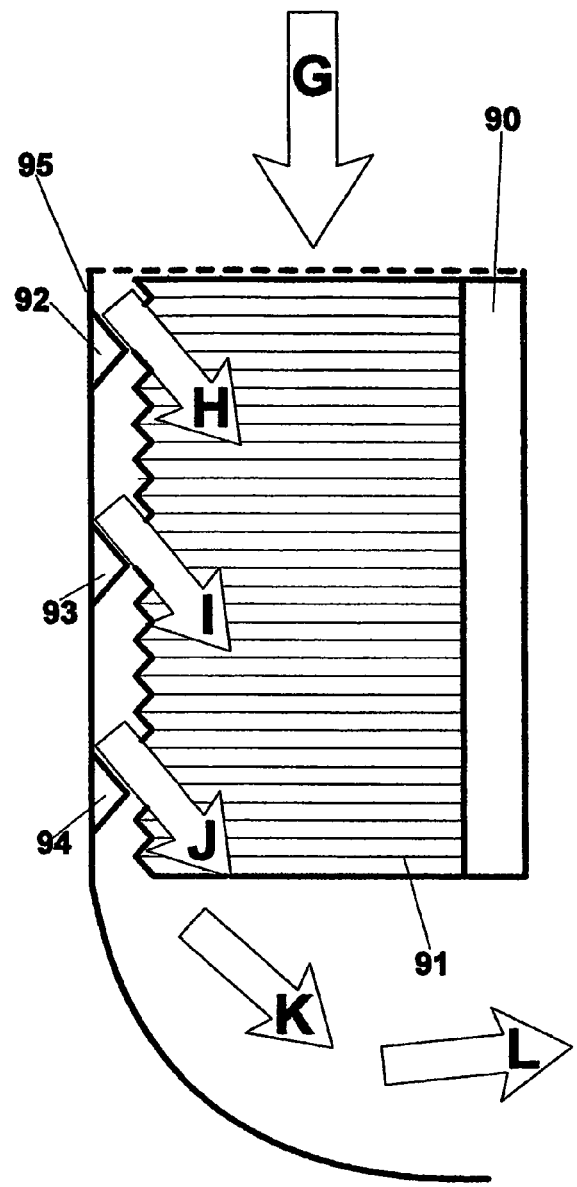
FIG. 5 is a partial schematic side cross-sectional view of another alternative embodiment of the invention.

FIGS. 4 and 5 schematically depict alternative embodiments of the invention, in which other known components are not shown for clarity purposes. FIG. 4 is a top view of the entrance to air duct 83, in which is located hot or cold sink 80 with corrugated heat-exchange fins 81 projecting therefrom. Corrugated fins contribute to a greater heat exchange rate as opposed to straight fins, due to both their greater surface area and the air flow turbulence created by the corrugations. In this embodiment, the corrugations are parallel to the air flow. An additional separate feature that contributes to a greater heat exchange rate is the incorporation onto one or more sidewalls of duct 83 of one or more projecting artifacts 82, which direct air away from the duct walls and thereby increase air turbulence, which increases the contact of the air with the fins 81. Projection(s) 82 can take any desired shape, but are preferably roughly triangular in cross-section to present a smooth ramp from which the air flow is directed toward the fins.

This flow is shown schematically in FIG. 5. Artifacts 92-94 on the wall of duct 95 redirect air toward fins 91 (which are coupled to hot or cold sink 90), as depicted by air flow direction indicating arrows G through L. This figure also depicts fins with corrugations that are perpendicular to the air flow rather than parallel to it.

Although specific features of this invention are shown in some drawings and not others, this is for convenience only as each feature may be combined with any or all of the other features in accordance with the invention.

Other embodiments will occur to those skilled in the art and are within the following claims:

The invention claimed is:

1. A water generating device for extracting water from ambient air, comprising:
a thermoelectric cooling device having a cold side and a hot side;
a cold sink thermally coupled to the cold side of the cooling device, for cooling air that contacts the cold sink;
a heat sink thermally coupled to the hot side of the cooling device, for removing heat from the cooling device;
one or more air moving means for directing a stream of ambient air past the cold sink, to cool the air below its dew point and condense water from the air stream; and
passage means for directing the air cooled by the cold sink past the heat sink, to remove additional heat from the cooling device, to increase its efficiency.

2. The water generating device of claim 1 further including dew point sensor means for determining the dew point of the ambient air.

3. The water generating device of claim 2 in which at least one of the air moving means accomplishes a variable air speed.

4. The water generating device of claim 3 further including a controller means, responsive to the dew point sensor means, that controls the speed of at least one of the variable-speed air moving means in response to the ambient air dew point, to increase the overall device water generating efficiency, and operate the device over a wider range of ambient conditions.

5. The water generating device of claim 1 in which the passage means includes an air duct in which both the cold sink and heat sink are housed.

6. The water generating device of claim 5 further including a condensed water outlet in the air duct, to allow the condensed water to pass out of the duct.

7. The water generating device of claim 6 in which the air duct is arranged with a lowest area, and the condensed water outlet is in the bottom of the duct in its lowest area.

8. The water generating device of claim 6 further including an ultraviolet light proximate the outlet, to irradiate condensed water exiting the duct through the outlet, to sterilize the water.

9. The water generating device of claim 6 further including a water storage device for holding condensed water passed out of the duct through the outlet.

10. The water generating device of claim 3 further including a temperature sensor for determining the temperature of the cold sink.

11. The water generating device of claim 10 further including a controller means, responsive to both the temperature sensor and the dew point sensor means, that controls the speed of the variable-speed air moving means, to maintain the cold sink below the dew point of the ambient air.

12. A water generating device for efficiently extracting water from ambient air, comprising:
a thermoelectric cooling device having a cold side and a hot side;
a cold sink thermally coupled to the cold side of the cooling device, for cooling air that contacts the cold sink;
a heat sink thermally coupled to the hot side of the cooling device, for removing heat from the cooling device;
an air duct providing an air passage past the cold sink and directly to and past the heat sink;
at least one variable-speed air moving device for directing a stream of ambient air through the air duct past the cold sink to cool the air below its dew point and condense water from the air stream, and then past the heat sink, to remove additional heat from the cooling device to increase its efficiency;
a dew point sensor for determining the dew point of the ambient air;
a temperature sensor for determining the temperature of the cold sink; and
a controller, responsive to both the dew point sensor and the temperature sensor, that controls the speed of at least one of the variable-speed air moving devices, to maintain the cold sink temperature below the ambient air dew point, to maintain efficient water production.

13. The water generating device of claim 1 further including an ultraviolet light proximate the cold sink.

14. The water generating device of claim 1 further including an ultraviolet light proximate the hot sink.

15. The water generating device of claim 1 enabled for continuous operation.

16. The water generating device of claim 2, further including means for periodically sampling the dew point of the ambient air.

17. The water generating device of claim 2 enabled for an efficiency mode of operation in which the device is operated only when the dew point is at least at a predetermined level.

18. The water generating device of claim 5 in which the air duct defines an ambient air entrance that communicates with the heat sink, and further comprising an air moving means in fluid communication with such entrance to allow additional ambient air to be moved across the heat sink, to enhance cooling of the heat sink.

19. The water generating device of claim 18 further including a heat sink temperature sensing means.

20. The water generating device of claim 19 further including controller means, responsive to the heat sink temperature sensing means, for controlling operation of the additional air moving device.

21. The water generating device of claim 1 further including means to heat stored water.

22. The water generating device of claim 1 further including means to cool stored water.

23. The water generating device of claim 1 further including means to change the temperature of water that has been extracted from ambient air using the device.

24. The water generating device of claim 1 further including solar power generating means operatively coupled to the water generating device for providing power to operate the water generating device.

25. The water generating device of claim 5 further including one or more air diverters located within the air duct to increase turbulence of air flow through the duct, for increasing the efficiency of the device.

26. The water generating device of claim 1 wherein at least one of the heat sink and the cold sink comprise corrugated fins.

27. The water generating device of claim 26 wherein the corrugations of the fins are parallel to the air flow through the passage means.

28. The water generating device of claim 26 wherein the corrugations of the fins are perpendicular to the air flow through the passage means.

29. A system for providing sterilized air to a storage container that stores water from a water generating device that extracts water from ambient air, comprising:

passage means for providing air flow into the storage container as water is withdrawn from the storage container; and an ultraviolet light which bathes the passage means in ultraviolet light to sterilize the air as it enters the passage means.

* * * * *